Figures 1, 2:
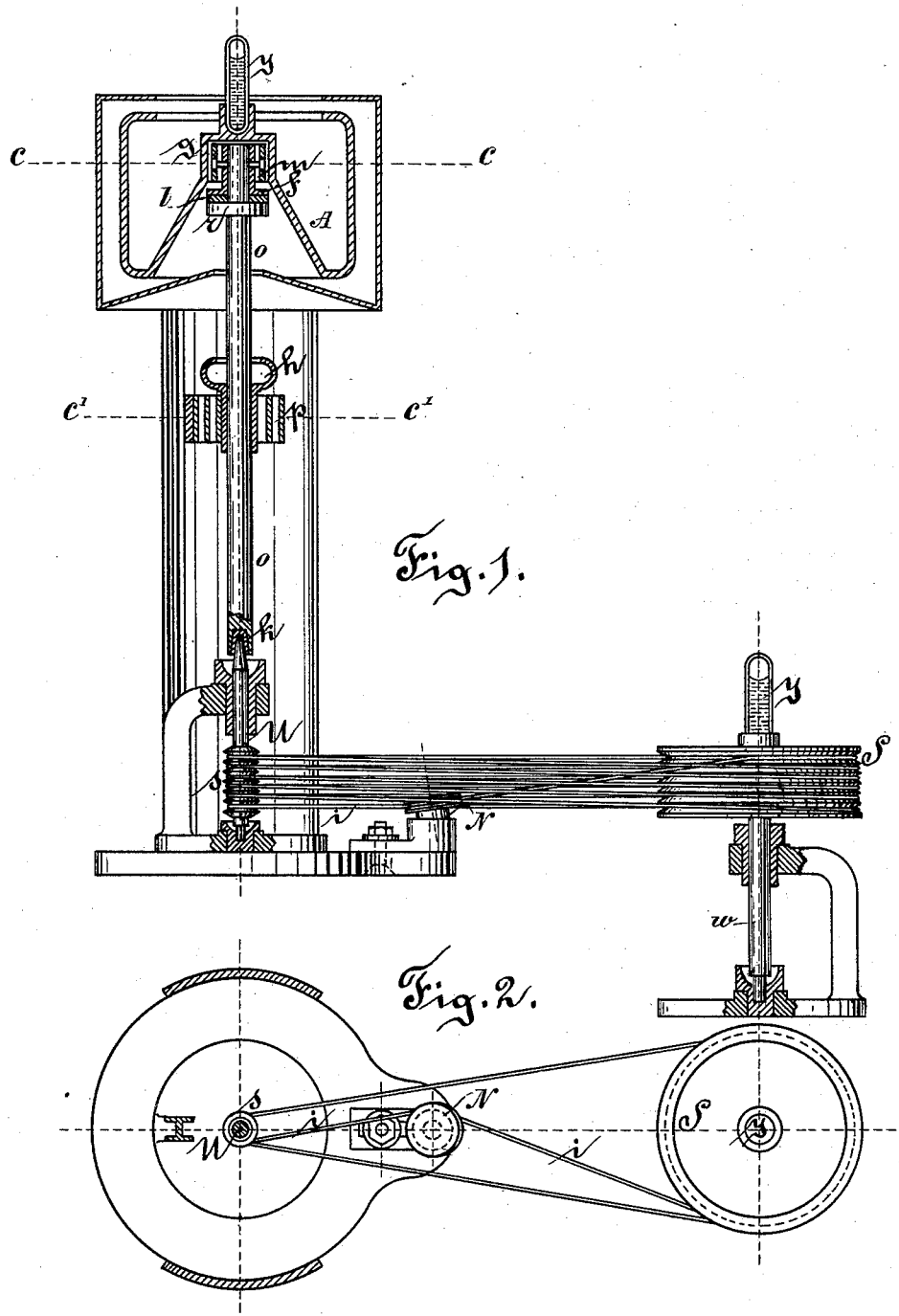

(No Model.) 2 Sheets—Sheet 1.

O. BRAUN.
CENTRIFUGAL MACHINE.

No. 392,583. Patented Nov. 13, 1888.

Witnesses:
John M. Speer.
T. F. Bourne.

Inventor:
Otto Braun,
by
Briesen, Steele & Knauth,
Attorneys.

(No Model.) 2 Sheets—Sheet 2.
O. BRAUN.
CENTRIFUGAL MACHINE.
No. 392,583. Patented Nov. 13, 1888.
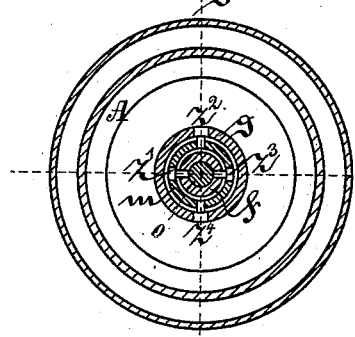
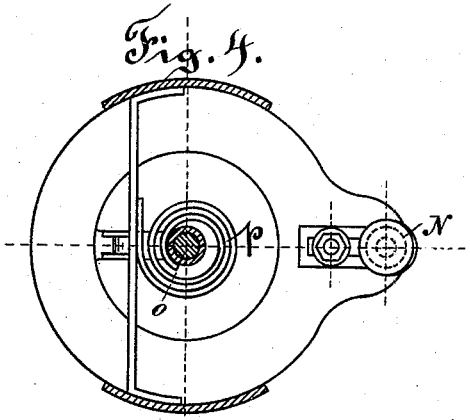
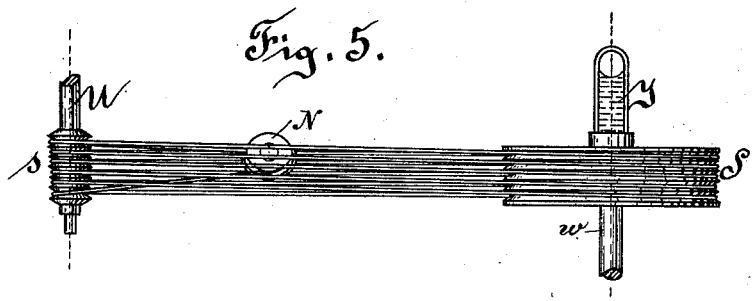
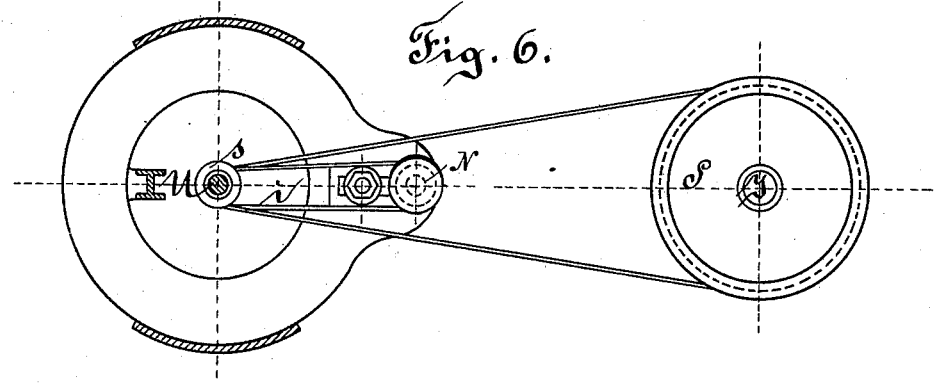
Witnesses:
John M. Speer.
T. F. Bourne.
Inventor:
Otto Braun,
by
Briesen, Steele & Knauth,
Attorneys.

UNITED STATES PATENT OFFICE.

OTTO BRAUN, OF BERLIN, GERMANY.

CENTRIFUGAL MACHINE.

SPECIFICATION forming part of Letters Patent No. 392,583, dated November 13, 1888.

Application filed May 11, 1888. Serial No. 273,640. (No model.)

*To all whom it may concern:*

Be it known that I, OTTO BRAUN, of the city of Berlin, in the Kingdom of Prussia, German Empire, have invented Improvements in Centrifugal Machines, of which the following is a specification.

The balance-regulators used heretofore with the drums of centrifugal machines are adapted to bring the center of gravity of the drum into the axis of rotation; but they can only in a very few cases distribute the mass of the drum in such manner that the plane of gravity—i. e., the plane in which the drum possesses the greatest inertia—is perpendicular to the axis of rotation. It is for this reason that the motion of centrifugal machines mounted elastically in a spring-bearing is not yet quite satisfactory. The centrifugal power tends to bring into the equator the plane of gravity and finds a resistance, changing with the velocity of rotation, in the parts fastening the drum to its shaft. The vertical component of the directing power acts downward, shock-like, wearing off the step-bearing and shaking the foundation. The present invention remedies this defect by using a drum suspended by means of a universal joint which is applied to the shaft above the plane of gravity of the hollow empty drum, said shaft being mounted elastically in any convenient way.

Reference is to be had to the accompanying drawings, forming part of this specification, in which—

Figure 1 is a partly sectional side elevation of a centrifugal machine containing my improvements. Fig. 2 is a sectional plan view of the same. Fig. 3 is a horizontal section on the line $c\,c$, Fig. 1. Fig. 4 is a detail horizontal section on the line $c'\,c'$, Fig. 1. Fig. 5 is a detail side view of a modified form of driving-gear, and Fig. 6 is a detail top view of the same shown in position in the apparatus.

The universal joint shown in Fig. 3 of the drawings is composed of the four trunnions or studs $z'\,z^2\,z^3\,z^4$ and the three rings $f\,m\,g$. To the latter ring $g$ the drum A is fastened. The ring $f$ is not fixed on the shaft O, but only united to it by the weight of the drum pressing the ring $f$ upon a collar, $r$, on the shaft O, a leather or analogous ring, $l$, being interposed between the ring $f$ and the collar $r$. The frictional contact of the ring $f$, washer $l$, and collar $r$ is sufficient to transfer to the drum A the velocity of rotation of the shaft O; but this friction ought to be less at this place than between any two other parts of the gearing, for the reason that the slip, inevitable at the start and at speed changes, takes place only at the said leather ring or washer $l$.

For fear that the belt-draft should draw the elastically-mounted shaft out of its vertical position, said shaft is divided in two parts, an upper part, $o$, that is hung elastically at $h$ in a spring-bearing, $p$, and a lower or under part, $u$, which rotates in stationary bearings. The upper part, $o$, of the shaft O is provided at its lower end with a conical opening that receives the upper tapered end of the lower part, $u$, of the shaft O. Within the recessed end of the upper shaft part, $o$, is a rubber sleeve, $k$, that fits tightly over the conical top of the under shaft part, $u$. The rubber sleeve $k$ thereby forms a coupling or connection between the upper and lower parts, $o\,u$, of the shaft O, that is able to turn elastically but not to be distorted materially. Said coupling also acts as a cushion to the upper shaft part, $o$. The sleeve $k$ and the spring $p$ permit the shaft O to oscillate, so that the center of gravity of the drum can pass into the prolongation of the axis of the vertical under shaft, $u$.

The shaft $u$ is driven from a shaft, $w$, Figs. 1, 2, and 5, by a single endless belt, rope, or cord embracing the two pulleys S and $s$, the former on $w$ and the latter on $u$. Said belt or cord is shown in the drawings to pass around the pulley five times. The thrum or cord $i$, running from the uppermost groove of the pulley S to the lowest groove of the pulley $s$ upon the shaft part $u$, is guided by the guide-roller N, suitably supported on the base of the machine. By this means an entanglement of the cord is prohibited as well as a tightening of the cord permitted, so that the tension of all leading thrums or cords can be kept uniform. The arrangement of the belt or cord can also be made in such manner (shown in Figs. 5 and 6) that one of the pulleys is embraced by the belt or cord once more than the other pulley, the last turn of the cord embracing the guide-roller N, which, for tightening the cord, is shifted radially from the pulley that receives the most turns of the cord.

The cord of fivefold length has against five single endless cords the advantage of uniform tension in all thrums, and against a single cord of fivefold thickness the advantage that pulleys of smaller diameter may be used. With the single many-fold embracing cord a speed of the drum can be attained which would be impossible to be attained otherwise.

For inspecting and judging the speed of the drum A, a glass tube, $y$, partly filled with a colored fluid and sealed on both ends, is mounted axially upon the top of the shaft O, above the universal joint. The tube $y$ is suitably graduated. In rotating with the shaft O the fluid rises at the wall of the tube $y$, while the air-space inside is lowered according to the number of turns. In proportion as the air-limit reaches lower dividing-lines the speed will be greater. A similar speed-gage is applied to the shaft $w$, Figs. 1 and 5. By noting the difference of the marks of the speed-gage on the shafts O and $w$ the loss of speed which has taken place in the intermediate mechanisms between the shaft $w$ and the drum of the centrifugal machine can be determined.

Having now described my invention, what I claim is—

The lower shaft, $u$, turning in fixed bearings, upper shaft, $o$, resting on the shaft $u$, and a friction-cone connection between the shafts $u$ and $o$, the spring $p$, surrounding the shaft $o$, near its upper end, and a friction-collar on the shaft $o$, in combination with the drum A and the universal joint $f\ g\ m$, carried by the drum and resting on the friction-collar, substantially as herein shown and described.

This specification signed by me this 1st day of February, 1888.

OTTO BRAUN.

Witnesses:
CHAPMAN COLEMAN,
ULV. R. MAERZ.